US008184314B2

(12) United States Patent
Oh

(10) Patent No.: US 8,184,314 B2
(45) Date of Patent: May 22, 2012

(54) IMAGE FORMING APPARATUS AND A COMMUNICATION METHOD WITH TRAYS THEREOF

(75) Inventor: Han-sang Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1397 days.

(21) Appl. No.: 11/438,272

(22) Filed: May 23, 2006

(65) Prior Publication Data

US 2007/0001379 A1 Jan. 4, 2007

(30) Foreign Application Priority Data

Jun. 29, 2005 (KR) ........................ 10-2005-0056804

(51) Int. Cl.

| | |
|---|---|
| ***G06F 3/12*** | (2006.01) |
| ***G06K 15/00*** | (2006.01) |
| ***G03G 15/00*** | (2006.01) |

(52) U.S. Cl. ..................... 358/1.15; 358/1.13; 358/1.14; 399/12; 399/391; 399/393

(58) Field of Classification Search ................. 358/1.14, 358/1.15, 1.16, 1.12, 1.13; 399/12, 391, 399/393, 76, 124, 388, 36; 700/2, 8, 11, 700/19, 213

See application file for complete search history.

(56) References Cited

U.S. PATENT DOCUMENTS

| | | | | | |
|---|---|---|---|---|---|
| 4,736,255 | A * | 4/1988 | Miura et al. | 358/300 |
| 4,924,320 | A * | 5/1990 | Tanaka et al. | 358/296 |
| 4,970,544 | A * | 11/1990 | Furusawa et al. | 355/24 |
| 5,095,371 | A * | 3/1992 | Tanaka et al. | 358/300 |
| 5,446,524 | A * | 8/1995 | Koike | 399/45 |
| 5,598,258 | A * | 1/1997 | Sato et al. | 399/85 |
| 5,839,015 | A * | 11/1998 | Faguy et al. | 399/23 |
| 5,963,755 | A * | 10/1999 | Ueda et al. | 399/23 |
| 6,304,342 | B1 * | 10/2001 | Komada | 358/448 |

(Continued)

FOREIGN PATENT DOCUMENTS

CN 1231445 A 10/1999

(Continued)

OTHER PUBLICATIONS

Office Action issued by Chinese Patent Office in Chinese Patent Application No. 2006100943792 on Aug. 8, 2008.

(Continued)

*Primary Examiner* — James A Thompson
*Assistant Examiner* — Jonathan Beckley
(74) *Attorney, Agent, or Firm* — Staas & Halsey LLP

(57) ABSTRACT

An image forming apparatus having a main body and optional trays and a communication method between the main body and the optional trays, the apparatus including: the main body having a main controller; at least one optional tray detachably set up in the main body and having a tray controller for communicating with the main controller to transmit and receive data; and communication lines forming a communication channel connecting the main controller and the tray controllers, for data exchange, and for informing the main controller that the data is provided from tray controllers to the main controller. Since the main body and the optional trays communicate through a single UART communication channel, the number of communication channels is decreased thereby saving time and simplifying protocol as well as reducing costs and simplify circuits. Also, it is possible to assign IDs rapidly and simply, prevent generation of errors in ID assignment, and make use of the image forming apparatus convenient.

25 Claims, 3 Drawing Sheets

U.S. PATENT DOCUMENTS

| | | | | |
|---|---|---|---|---|
| 6,545,766 | B1 * | 4/2003 | Shima et al. | 358/1.14 |
| 6,614,545 | B1 * | 9/2003 | Langer et al. | 358/1.15 |
| 6,697,679 | B2 * | 2/2004 | Hatakeyama | 700/13 |
| 6,729,781 | B2 * | 5/2004 | Murase | 400/76 |
| 6,995,854 | B1 * | 2/2006 | Murakoshi | 358/1.15 |
| 7,103,289 | B2 * | 9/2006 | Hong | 399/12 |
| 7,170,801 | B2 * | 1/2007 | Lee et al. | 365/200 |
| 7,180,628 | B1 * | 2/2007 | Motohashi et al. | 358/1.9 |
| 7,295,464 | B2 * | 11/2007 | Cho et al. | 365/163 |
| 7,397,576 | B2 * | 7/2008 | Hong et al. | 358/1.15 |
| 7,484,831 | B2 * | 2/2009 | Walmsley et al. | 347/49 |
| 7,519,873 | B2 * | 4/2009 | Shin et al. | 714/703 |
| 2001/0007619 | A1 * | 7/2001 | Kakutani | 400/582 |
| 2003/0048474 | A1 | 3/2003 | Hong et al. | |
| 2003/0057639 | A1 * | 3/2003 | Chapman et al. | 271/270 |
| 2007/0217389 | A1 * | 9/2007 | Seo et al. | 370/349 |

FOREIGN PATENT DOCUMENTS

| | | |
|---|---|---|
| KR | 1987-5723 | 4/1987 |
| KR | 1992-9347 | 10/1992 |
| KR | 2001-64761 | 7/2001 |
| KR | 10-0378172 | 3/2003 |

OTHER PUBLICATIONS

Office Action issued in Korean Patent Application No. 2005-56804 on Sep. 29, 2006.

* cited by examiner

IMAGE FORMING APPARATUS AND A COMMUNICATION METHOD WITH TRAYS THEREOF

CROSS-REFERENCE TO RELATED APPLICATIONS

This application claims the benefit of Korean Patent Application No. 2005-56804 filed Jun. 29, 2005, in the Korean Intellectual Property Office, the disclosure of which is incorporated herein by reference.

BACKGROUND OF THE INVENTION

1. Field of the Invention

An aspect of the present invention relates to an image forming apparatus and a communication method with trays thereof; and, more particularly, to an image forming apparatus that can communicate with trays through a single communication channel and assign an identification (ID) to each tray simply and accurately, and its communication method with its trays.

2. Description of the Related Art

Recently, functions of image forming apparatuses are diversified such as a function of a printer and a function of a copier, and the image forming apparatuses are connected through a network. This has increased the required quantity of recording media and thus the image forming apparatuses should be equipped with many optional trays. Therefore, image forming apparatuses with a plurality of optional trays stacked in multiple steps are widely used these days. Each optional tray of an image forming apparatus communicates with the main body of the image forming apparatus through a communication channel. Herein, a one-to-one communication UART is usually used as the communication scheme.

FIG. 1 is a schematic diagram showing a conventional communication scheme between the main body of an image forming apparatus and its optional trays. According to the UART communication scheme shown in the drawing, the main body 10 of the image forming apparatus is assigned in advance with as many communication channels as the number of available optional trays 20, 30 and 40 and, when each optional tray 20, 30 or 40 is mounted in the main body 10, it is connected to the main body 10 to be able to communicate through a one-to-one communication channel. Therefore, since the main body 10 uses a separate communication channel to communicate with each optional tray 20, 30 or 40 one-to-one, it requires as many communication channels as the number of optional trays 20, 30 and 40.

A first optional tray 20 is connected to the main body 10 through a first UART communication channel, and a second optional tray 30 is connected to the main body 10 through a second UART communication channel. Likewise, a third optional tray 40 is connected to the main body 10 through a third UART communication channel. Thus, the image forming apparatus transmits a control command through the first UART to operate the first optional tray 20 and transmits a control command through the second UART to operate the second optional tray 30. For example, when the main body 10 transmits a feeding command to the second optional tray 30 through the second UART, the second optional tray 30 drives a feeding motor for operating a feeding roller (not shown) to feed a recording medium.

Since the conventional image forming apparatus performs one-to-one communication between its main body 10 and each optional tray 20, 30 or 40 through a UART communication channel, it has an advantage that communication protocol is simple. However, it requires as many communication channels as the number of optional trays it can have in the main body 10 and it takes a high amount of costs to form the main body 10 to be connected with a plurality of communication channels. Moreover, since many communication channels are applied to the main body 10, the conventional image forming apparatus has a shortcoming that a Central Processing Unit (CPU) of the main body 10 suffers much load.

In order to reduce the amount of load applied to the CPU, a method of connecting the main body and optional trays through a UART communication channel and then connecting a first optional tray and a second optional tray through a UART communication channel has been suggested. However, although the method can reduce the amount of load applied to the CPU, it still requires as many UART communication channels as the number of optional trays because it needs a UART communication channel between the main body and the first optional tray and a UART communication channel between the first optional tray and the second optional tray separately. Therefore, there are problems that it takes much cost for building up a plurality of UART communication channels and that the circuit is complex.

Since the conventional image forming apparatus needs as many UART communication channels as optional trays, the number of optional trays that can be used in the image forming apparatus is limited.

To solve the problem, a method that can reduce costs and complexity in the circuit by using a single communication channel between the main body and the optional trays should be sought.

Korean Patent No. 10-378172 entitled “Tray recognizing apparatus and method,” discloses a structure where each of a plurality of optional trays is assigned an ID. According to this technology, a power supplier of the main body supplies power to a controller of a first optional tray, and the first optional tray transmits the power to a second optional tray. In short, the power is supplied from the main body to the optional trays sequentially. Herein, since each optional tray has a resistance set up therein, the level of power is decreased as the power passes through each resistance. Thus, the main body can assign an ID to each optional tray based on the voltage value of power applied to each optional tray. However, since a contact resistance may be generated by a connector, the voltage value applied to each optional tray can be different from an expected level and the voltage difference between the optional trays can be diverse. Therefore, an error may occur when the main body communicates with each optional tray or when an ID is assigned to each optional tray.

Other than the above-described method, there is a method of providing a switch for manually setting each optional tray. According to this method, a user turns on a switch after mounting each optional tray. Then, each optional tray recognizes its own ID and transmits its ID to a main controller. This method, however, has a drawback in that a user has to manually manipulate the switch and, if the same ID is set for a different optional tray due to a mistake of the user, data can be entangled during data transmission and reception.

Therefore, a method that can relieve users from manually setting up an ID and assigning an ID to each optional tray rapidly and accurately is needed.

SUMMARY OF THE INVENTION

It is, therefore, an aspect of the present invention to provide an image forming apparatus that can simplify a circuit and reduce costs by using a single communication channel between a main body and optional trays, and a communication method with optional trays thereof.

It is another aspect of the present invention to provide an image forming apparatus that can relieve users from the trouble of setting up an ID for themselves and assign an ID to each optional tray rapidly and accurately, and a communication method with optional trays thereof.

In accordance with an aspect of the present invention, there is provided an image forming apparatus, which includes: a main body having a main controller for controlling the image forming apparatus to output image; at least one optional tray which is set up in the main body detachably and has a tray controller for communicating with the main controller to transmit and receive data; and communication lines that form one communication channel connecting the main controller and each tray controller, make the main controller and the tray controller exchange data, and inform the main controller that data are provided from at least one tray controller to the main controller.

In accordance with another aspect of the present invention, the communication lines include a TXD line for providing data from the main controller to each tray controller, an RXD line for providing data from the tray controller to the main controller, and a busy line for informing that data are provided from at least one tray controller to the main controller through the RXD line.

In accordance with another aspect of the present invention, each line for connecting the RXD line with each tray controller includes an open connector set up therein for preventing collision between signals from different tray controllers, and a line for connecting the RXD line and the main controller includes a pull-up resistance for turning on the open collector.

In accordance with another aspect of the present invention, a line for connecting the busy line with each tray controller includes an open collector set up therein for preventing collision between signals transmitted from different tray controllers, and a line for connecting the busy line and the main controller includes a pull-up resistance for turning on the open collector.

In accordance with another aspect of the present invention, data from each tray controller can go through wired-OR in each open collector and a result obtained from the wired-OR is transmitted to the main controller.

In accordance with another aspect of the present invention the communication lines can adopt a UART communication scheme.

In accordance with another aspect of the present invention, there is provide an image forming apparatus, which includes: a main body having a main controller for controlling the image forming apparatus to output an image; at least one optional tray which is set up in the main body detachably and has a tray controller for communicating with the main controller to transmit and receive data; communication lines for forming at least one communication channel for communication between the main controller and tray controllers; and a plurality of reset lines for connecting the main controller of the main body and a tray controller of an optional tray closest to the main body, and connecting the tray controllers of adjacent optional trays together sequentially.

Preferably, but not necessarily, each reset line includes a pull-down resistance for pulling down voltage to maintain a reset mode.

The tray controllers of optional trays can be revoked from the reset mode sequentially from the tray controller of an optional tray closest to the main controller based on a reset revocation signal transmitted form the main controller.

The main controller assigns an ID to each of the optional trays sequentially through the communication lines, when the optional trays are revoked from the reset mode.

Preferably, but not necessarily, when the tray controller of the optional tray closest to the main body is assigned with the ID, the tray controller of the optional tray closest to the main body transmits a reset revocation signal to the tray controller of a next closest optional tray.

In accordance with another aspect of the present invention, there is provided a method of communicating between a main body and trays in an image forming apparatus having a main body with a main controller, and at least one optional tray having a tray controller, the method including forming a single communication line connecting the main controller with the tray controllers; and transmitting data from the main controller to the tray controllers or from the tray controllers to the main controller through the communication line, wherein the main controller of the main body controls the image forming apparatus to output an image, and the optional tray is detachably set up in the main body and has the tray controller for data communication with the main controller.

In accordance with another aspect of the present invention, there is provided a method of communicating between a main body and trays in an image forming apparatus having a main body with a main controller and at least one optional tray having a tray controller, the method including forming a plurality of reset lines connecting the main controller of the main body with a tray controller of an optional tray closest to the main body and connecting tray controllers of adjacent optional trays; and setting up a pull-down resistance for pulling down voltage to maintain a reset mode for each reset line, wherein the main controller controls the image forming apparatus to output an image, and the optional tray is detachably set up in the main body and has the tray controller for communicating with the main controller to transmit and receive data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantage of the invention will become more apparent and more readily appreciated from the following description of the embodiments, taken in conjunction with the accompanying drawings of which.

DETAILED DESCRIPTION OF THE EMBODIMENTS

Figure 1:
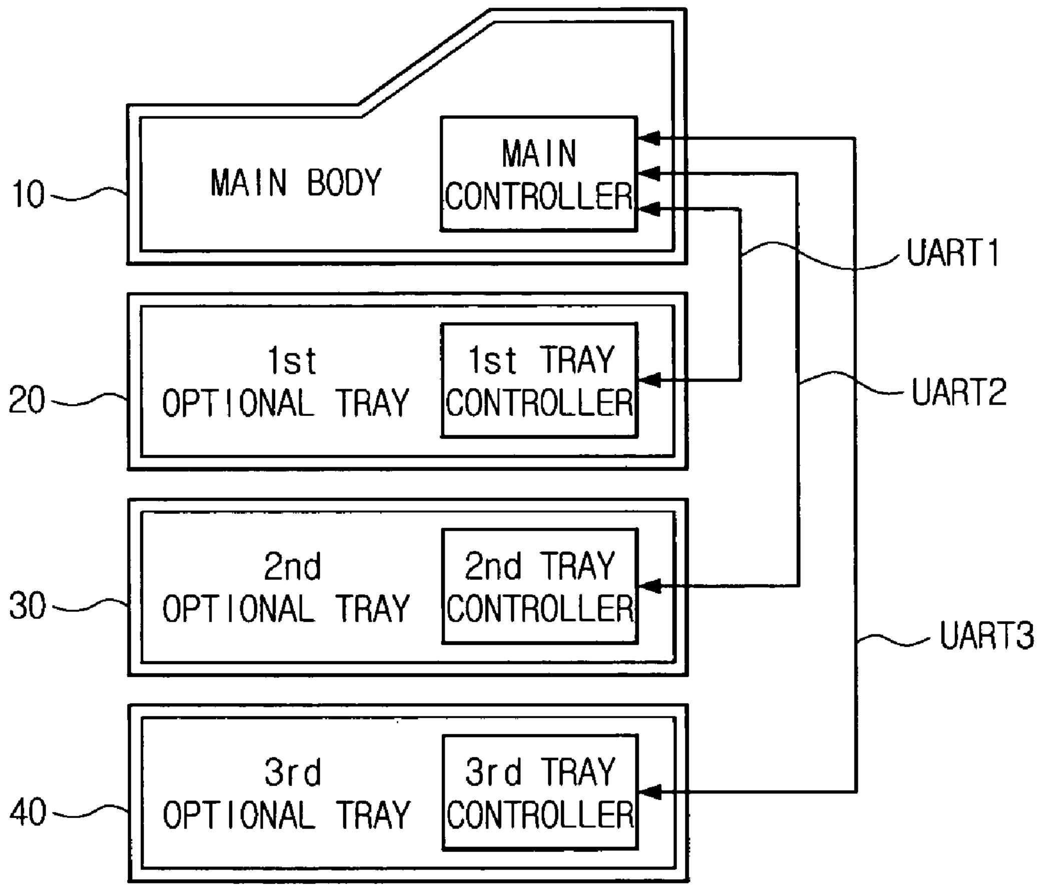
FIG. 1 (PRIOR ART)
FIG. 1 is a schematic diagram showing a conventional communication scheme between a main body of an image forming apparatus and its optional trays.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
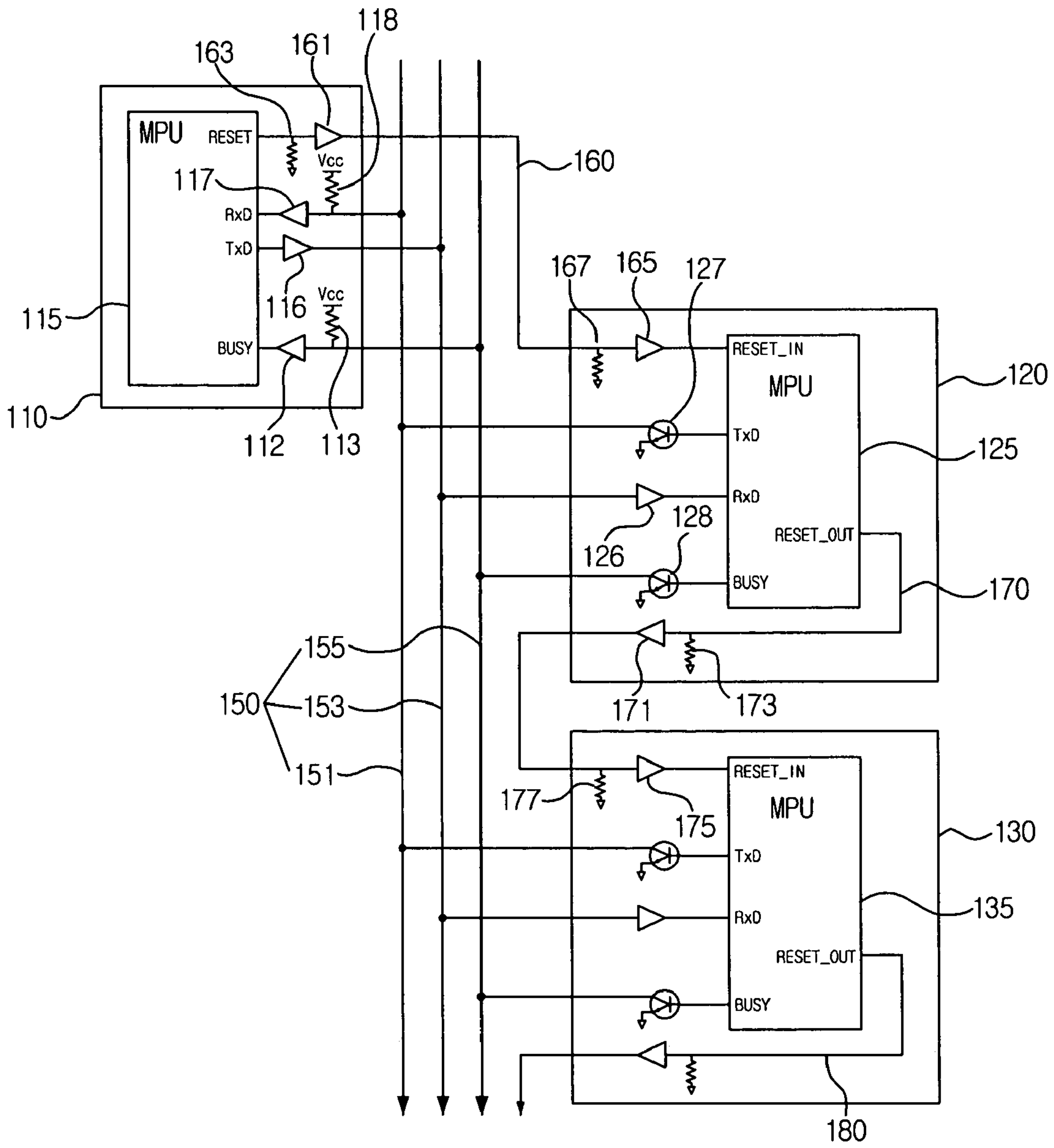
FIG. 2 is a circuit diagram illustrating a communication scheme between a main body of an image forming apparatus and its optional trays in accordance with an embodiment of the present invention.

FIG. 2 is a circuit diagram illustrating a communication scheme between a main body of an image forming apparatus and its optional trays in accordance with an embodiment of the present invention. As shown in the drawing, the image forming apparatus includes a main body 110 having a main controller 115, and a plurality of optional trays 120 and 130 having tray controllers 125 and 135, respectively.

The main body 110 and the optional trays 120 and 130, which are a first optional tray 120 and a second optional tray 130, respectively, are connected through three communication lines which form a single UART communication channel. Herein, the three communication lines include a TXD line 153 for transmitting data from the main body 110 to the optional trays 120 and 130, an RXD line 151 for transmitting data from the optional trays 120 and 130 to the main body 110, and a busy line 155 for notifying that an optional tray is in the middle of transmitting data to the main body 110.

Among the lines, a line for connecting the main controller 115 of the main body 110 and the TXD line 153 includes a first buffer 116 set up therein, and a line connecting the TXD line 153 and the tray controllers 125 and 135 of the optional trays 120 and 130 includes a second buffer 126. Through the TXD line 153, the main controller 115 of the main body 110 transmits a control command to the optional trays 120 and 130. For example, when the main controller 115 of the main body 110 generates a feeding command requesting the first optional tray 120 to feed a recording medium contained therein, the feeding command is transmitted from the main controller 115 to the tray controllers of all optional trays mounted in the main body 110 including not only the first optional tray 120 but also the second optional tray 130 through the TXD line 153. Herein, the main controller 115 transmits a predetermined ID of the first optional tray 120 along with the feeding command. Thus, although the tray controllers 125 and 135 of all the optional trays 120 and 130 receive the feeding command, only the first optional tray 120 executes the feeding command and the other optional tray with a different ID is not operated. In short, only the first optional tray 120 drives a feeding motor to operate a feeding roller for feeding a recording medium.

Meanwhile, a line connecting the RXD line 151 and the main controller 115 of the main body 110 includes a third buffer 117 and a first pull-up resistance 118 for supplying power for operating a first open collector 127, and a line connecting the RXD line 151 and the tray controllers 125 and 135 of the optional trays 120 and 130 includes the first open collector 127 set up therein. Herein, the first open collector 127 is used to prevent a short-circuit which can be caused when a plurality of outputs are connected in a Complementary Metal Oxide Semiconductor (CMOS) device or a TTL circuit performing a complementary operation. It performs a wired-OR function when a plurality of outputs are connected through the first open collector 127. According to the wired-OR function, each open collector 127 connected to each RXD line 151 sends out an 'L' signal to the main controller 115 when data outputted from each optional tray 120 or 130 has both a 'high (H)' state and a 'low (L)' state, that is, when data outputted from each optional tray 120 or 130 have at least one 'L' state.

The RXD line 151 transmits data from the tray controllers 125 and 135 of the optional trays 120 and 130 to the main controller 115 of the main body 110, and the data is mainly composed of data of the state of the optional trays 120 and 130 which is sensed by sensors. Most of the transmitted data is concerned with whether there is a recording medium jam, whether there is a recording medium, the remaining quantity of the recording medium, whether the recording medium is in the right position for being picked up, the size of the recording medium, and whether a pickup roller is driven.

Similar to the RXD line 151, a line connecting the busy line 155 and the main controller 115 of the main body 110 is connected to a fourth buffer 112 and a second pull-up resistance 113. Also, a line connecting the busy line 155 and the tray controllers 125 and 135 of the optional trays 120 and 130 is connected to a second open collector 128. The busy line 155 prevents collision between data caused when a plurality of optional trays 120 and 130 share one communication channel. When even one of the optional trays 120 and 130 transmits data to the main controller 115 through the RXD line 151, the busy line 155 transmits a busy signal to the main controller 115. In short, even when one 'L' signal is inputted from the optional trays to the main controller 115, the main controller 115 determines that the RXD line 151 is in use.

In the above-described structure of the UART communication channel, the main controller 115 of the main body 110 transmits such data as feeding commands to each optional tray 120 or 130 through the TXD line 153, and the tray controllers 125 and 135 of the optional trays 120 and 130 transmit the data of the state of the optional trays 120 and 130 to the main body 110 through the RXD line 151. Herein, the same data is transmitted to all the optional trays 120 and 130 through the TXD line 153. However, since the data includes an ID of an optional tray 120 or 130, only the corresponding optional tray is operated according to the data. Also, if any one of the optional trays 120 and 130 is in the middle of transmitting data to the main body 110, that is, if any one is in the 'L' state, the busy line 155 transmits data indicating that the RXD line 151 is in use to the main body 110 according to the wired-OR function of the second open collector 128.

Meanwhile, the main body 110 and the optional trays 120 and 130 are connected to each other through reset lines 160, 170 and 180 in order to assign an ID to each optional tray 120 or 130. First, the main body 110 and the first optional tray 120 are connected through a first reset line 160, and the first optional tray 120 and the second optional tray 130 are connected through a second reset line 170. The second optional tray 130 and yet another optional tray are connected through a third reset line 180.

Herein, the first reset line 160 is connected to pull-down resistances 163 and 167 and buffers 161 and 165 on the part of the main body 110 and on the part of the first optional tray 120, respectively. Likewise, the second reset line 170 is connected to pull-down resistances 173 and 177 and buffers 171 and 175 on the part of the first optional tray 120 and on the part of the second optional tray 130, respectively. Herein, the pull-down resistances 163, 167, 173 and 177 force the voltage to fall down in order not to generate output in the reset mode, that is, in order to output an 'L' signal.

Figure 3:
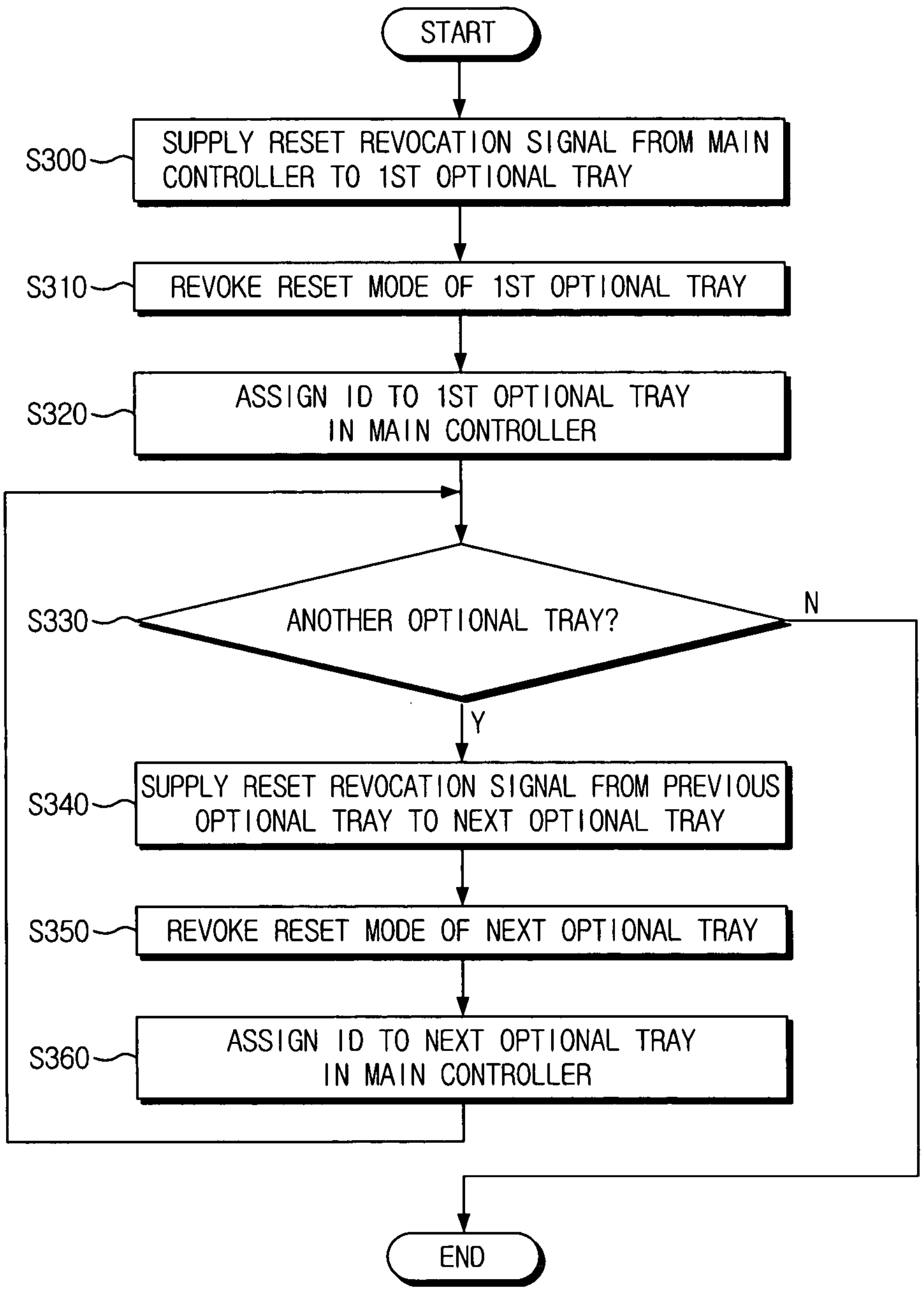
FIG. 3 is a flowchart describing a process of giving an identification (ID) to each optional tray in the image forming apparatus in accordance with an embodiment of the present invention.

A process of giving an ID through each reset line will be described herein with reference to FIG. 3.

First, when the power of the main body 110 is turned on, the first reset line 160 enters a reset mode by the pull-down resistances 163 and 167 set up in the first reset line 160 connecting the main body 110 and the first optional tray 120. Since the first optional tray 120 provides reset signals through the first reset line 160, the tray controller 125 of the first optional tray 120 maintains the reset mode. Likewise, the tray controller 125 of the first optional tray 120 provides reset signals to the tray controller 135 of the second optional tray 130 through the second reset line 170, the tray controller 135 of the second optional tray 130 maintains the reset mode as well. All the other optional trays including the first and second optional trays 120 and 130 maintain the reset mode.

At operation S300, when a reset revocation signal is transmitted to the tray controller 125 of the first optional tray 120 through the first reset line 160 by supplying an 'H' signal from the main controller 115 of the main body 110 to a first buffer 161 in the reset mode, i.e., in the 'L' state, at operation S310, the tray controller 125 of the first optional tray 120 is revoked from the reset mode. After the tray controller 125 of the first optional tray 120 gets out of the reset mode, the main controller 115 of the main body 110 communicates with the tray controller 125 of the first optional tray 120. When the communication is not successful, the main controller 115 informs a user of information on the communication error with the first optional tray 120. If the communication is made successfully, at operation S320, the main controller 115 assigns an ID to the first optional tray 120, and the tray controller 125 of the first optional tray 120 acknowledges to the main body 110 that it has received the ID. Then, the first optional tray 120 waits for a signal indicating that the ID has been assigned successfully and the reset mode is switched into a normal operation mode from the main body 110. Meanwhile, when there is another optional tray at operation S330, at operation S340, the first optional tray 120 transmits a signal for revoking the reset mode to the second optional tray 130 through the second reset line 170.

Then, at operation S350, the second optional tray 130, similar to the first optional tray 120, is revoked out of the reset mode and, at operation S360, the main body 110 communicates with the second optional tray 130 to assign an ID to the second optional tray 130. Herein, since the main controller 115 of the main body 110 has already assigned an ID to the first optional tray 120, it assigns another ID that is not the same as that of the first optional tray 120 to the second optional tray 130. Subsequently, the tray controller 135 of the second optional tray 130 acknowledges to the main controller 115 of the main body 110 that it has received the ID and waits for a sign indicating that its mode is switched into the normal operation mode from the main controller 115 of the main body 110.

Through the above-described ID assigning process from operations S330 to S360, another optional tray that can be provided to the main body can be revoked out of the reset mode and receive an ID assigned thereto.

According to the above-described ID assigning method, each of the optional trays receive an ID assigned thereto sequentially whenever the image forming apparatus is turned on. Therefore, users need not set up the IDs mechanically or electrically by using a switch for themselves. Therefore, this method makes the use of the image forming apparatus convenient. Also, it is possible to prevent an error form being generated due to a change in a resistance value during the ID assignment of each optional tray, which is a problem of conventional technology, by revoking each optional tray from the reset mode and assigning an ID sequentially. Therefore, each optional tray can be assigned with an ID more accurately and rapidly.

Meanwhile, since each optional tray and the main body communicate with each other through the RXD line 151, TXD line 153 and busy line 155, which form a single UART communication channel, the image forming apparatus according to an aspect of the present invention needs not a plurality of UART communication channels which are used in conventional technologies. Since the number of UART communication channels needs not be increased although the number of optional trays is increased, the circuit is simplified and costs are reduced. Also, since the entire optional trays can be controlled with one control command at the same time, it is possible to reduce time consumption for communication and simplify protocol.

The technology according to an aspect of the present invention described above can not only reduce costs and simplify the circuit but also reduces communication time and simplifies the protocol by making a communication between the main body and the optional trays through a single UART communication channel and reduces the number of communication channels.

Also, the technology according to an aspect of the present invention can prevent the generation of an error during the ID assignment and make the use of the image forming apparatus convenient as well as simplifying and rapidly generating the ID assignment by connecting the main body with an optional tray, and connecting the optional tray with another optional tray through reset lines, revoking the optional trays from the reset mode sequentially through the reset lines and assigning IDs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:

a main body having a main controller controlling the image forming apparatus to output an image;

at least one optional tray which is detachably set up in the main body and has a tray controller for communicating with the main controller to transmit and receive data; and communication lines that form one communication channel connecting the main controller and each tray controller, make the main controller and the tray controller exchange the data, and inform the main controller that the data is provided from at least one tray controller to the main controller, wherein the communication lines include a TXD line providing data from the main controller to each tray controller, an RXD line providing data from the tray controller to the main controller, and a busy line informing that the data is provided from at least one tray controller to the main controller through the RXD line, and the TXD line, the RXD line, and the busy line are separate from each other.

2. The image forming apparatus as recited in claim 1, wherein each line for connecting the RXD line with each tray controller includes an open collector set up therein for preventing collision between signals from different tray controllers, and a line for connecting the RXD line and the main controller includes a pull-up resistance for turning on the open collector.

3. The image forming apparatus as recited in claim 2, wherein a line for connecting the busy line with each tray controller includes an open collector set up therein for preventing collision between signals transmitted from different tray controllers, and a line for connecting the busy line and the main controller includes a pull-up resistance for turning on the open collector.

4. The image forming apparatus as recited in claim 3, wherein the data from each tray controller travels through wired-OR in each open collector and a result obtained from the wired-OR is transmitted to the main controller.

5. The image forming apparatus as recited in claim 4, wherein the communication lines adopt a UART communication scheme.

6. An image forming apparatus, comprising:

a main body having a main controller controlling the image forming apparatus to output an image;

at least one optional tray which is detachably set up in the main body and has a tray controller communicating with the main controller to transmit and receive data;

communication lines forming at least one communication channel for communication between the main controller and the tray controllers; and a plurality of reset lines, separate from the communication lines and including a first reset line connecting the main controller of the main body and the tray controller of the optional tray closest to the main body, and reset lines sequentially connecting the tray controllers of adjacent optional trays and wherein a signal output from the main controller to the tray controller on the first reset line is alternated between states to assign an ID to the at least one optional tray.

7. The image forming apparatus as recited in claim 6, wherein each reset line includes a pull-down resistance for pulling down voltage to maintain a reset mode.

8. The image forming apparatus as recited in claim 7, wherein the tray controllers of the optional trays are revoked from the reset mode sequentially from the tray controller of the optional tray closest to the main controller based on a reset revocation signal transmitted form the main controller.

9. The image forming apparatus as recited in claim 8, wherein the main controller assigns an ID to each of the optional trays sequentially through the communication lines, when the optional trays are revoked from the reset mode.

10. The image forming apparatus as recited in claim 9, wherein when the tray controller of the optional tray closest to the main body is assigned with the ID, the tray controller of the optional tray closest to the main body transmits a reset revocation signal to the tray controller of a next closest optional tray.

11. A method of communicating between a main body and trays in an image forming apparatus having a main body with a main controller, and each of the trays having a tray controller, the method comprising:

forming a single communication line connecting the main controller with the tray controllers;

forming a plurality of reset lines, separate from the communication lines and including a first reset line connecting the main controller with the tray controller closest to the main body and further including reset lines connecting the tray controllers of adjacent trays, wherein a signal output from the main controller to the tray controller on the first reset line is alternated between states to assign an ID to the at least one optional tray; and transmitting data from the main controller to the tray controllers or from the tray controllers to the main controller through the communication line, wherein the main controller of the main body controls the image forming apparatus to output an image, and the trays are detachably set up in the main body and have the tray controllers for data communication with the main controller.

12. The method as recited in claim 11, wherein the single communication channel includes a TXD line providing data from the main controller to the tray controllers, an RXD line providing data from the tray controllers to the main controller, and a busy line informing that data is provided from at least one of the tray controllers to the main controller through the RXD line.

13. The method as recited in claim 12, wherein when the data is provided from at least one of the tray controllers to the main controller through the RXD line and the busy line, the transmission of the data from the main controller to the tray controllers or from the tray controllers to the main controller further includes:

performing a wired-OR operation on data transmitted from each tray controller to thereby output wired-OR data; and providing the wired-OR data to the main controller.

14. The method as recited in claim 13, wherein a line connecting the RXD line with each tray controller includes an open collector set up therein, and a line connecting the RXD line with the main controller includes a pull-up resistance for turning on the open collector in order to perform wired-OR on the data outputted from each tray controller.

15. The method as recited in claim 13, wherein a line connecting the busy line with each tray controller includes an open collector set up therein, and a line connecting the busy line with the main controller includes a pull-up resistance for turning on the open collector in order to perform wired-OR on the data outputted from each tray controller.

16. A method of communicating between a main body and at least one optional tray in an image forming apparatus, the image forming apparatus having the main body with a main controller and the at least one optional tray having a tray controller, the method comprising:

forming a plurality of reset lines, separate from the communication lines and including a first reset line connecting the main controller of the main body with a tray controller of an optional tray closest to the main body and further including reset lines connecting the tray controllers of adjacent optional trays, wherein a signal output from the main controller to the tray controller on the first reset line is alternated between states to assign an ID to the at least one optional tray; and setting up a pull-down resistance for pulling down voltage to maintain a reset mode for each reset line, wherein the main controller controls the image forming apparatus to output an image, and the optional tray is detachably set up in the main body and has the tray controller for communicating with the main controller to transmit and receive data.

17. The method as recited in claim 16, further comprising:

generating a reset revocation signal in the main controller; and revoking the reset mode of the tray controllers sequentially from the tray controller of an optional tray closest to a main tray among the option trays.

18. The method as recited in claim 17, further comprising:

assigning an ID to each optional tray in the main controller according to an order that the reset mode of the tray controllers of the optional trays is revoked.

19. The method as recited in claim 18, further comprising:

providing a reset revocation signal from the optional tray closest to the main body and revoked from the reset mode to the tray controller of a next optional tray; and assigning an ID from the main controller to the tray controller of the next optional tray.

20. An image forming apparatus including:

a main body having a main controller;

first and second optional trays, each optional tray having a tray controller;

a plurality of communication lines connecting the main controller with the tray controllers of the first and second optional trays; and a plurality of reset lines, separate from the communication lines and connecting the main controller with the tray controllers of the first and second optional trays, wherein the first and second optional trays are sequentially assigned an ID by the main controller after one of the plurality of reset lines enters a reset mode.

21. The image forming apparatus of claim 20, wherein the communication lines include a TXD line providing data from the main controller to each of the tray controllers, an RXD line providing the data from each of the tray controllers to the main controller, and a busy line notifying the main controller that at least one of the optional trays is transmitting the data to the main controller.

22. The image forming apparatus of claim 21, wherein the RXD line includes open connectors between the main controller and each of the tray controllers preventing interference between signals transmitted from the tray controllers, and a pull-up resistance for turning on an open collector.

23. The image forming apparatus of claim 21, wherein the busy line includes open collectors between the main controller and each of the tray controllers preventing interference between signals transmitted from the tray controllers.

24. The image forming apparatus of claim 21, wherein the busy line includes a pull-up resistance located between the main controller and the tray controller for turning on an open collector.

25. The image forming apparatus of claim 21, wherein the communication lines include buffers located between the main controller and each of the tray controllers.

* * * * *

UNITED STATES PATENT AND TRADEMARK OFFICE

CERTIFICATE OF CORRECTION

PATENT NO. : 8,184,314 B2
APPLICATION NO. : 11/438272
DATED : May 22, 2012
INVENTOR(S) : Han-sang Oh It is certified that error appears in the above-identified patent and that said Letters Patent is hereby corrected as shown below:

Column 9, Line 26, In Claim 8, delete “form” and insert -- from --, therefor.

Signed and Sealed this
Seventh Day of August, 2012

David J. Kappos
*Director of the United States Patent and Trademark Office*